(12) United States Patent
Pettersson et al.

(10) Patent No.: US 9,803,966 B2
(45) Date of Patent: Oct. 31, 2017

(54) COORDINATE MEASURING MACHINE HAVING HIGH-PRECISION 3-D PRINTING FUNCTIONALITY

(71) Applicant: Hexagon Technology Center GmbH, Heerbrugg (CH)

(72) Inventors: Bo Pettersson, London (GB); Knut Siercks, Morschwil (CH); Pascal Jordil, Ecoteaux (CH)

(73) Assignee: Hexagon Technology Center GmbH, Heerbrugg (CH)

( * ) Notice: Subject to any disclaimer, the term of this patent is extended or adjusted under 35 U.S.C. 154(b) by 380 days.

(21) Appl. No.: 14/575,286

(22) Filed: Dec. 18, 2014

(65) Prior Publication Data

US 2015/0176956 A1 Jun. 25, 2015

(30) Foreign Application Priority Data

Dec. 20, 2013 (EP) ..................................... 13199065

(51) Int. Cl.
  *G01B 5/008* (2006.01)
  *G01B 21/04* (2006.01)
  *B29C 64/112* (2017.01)

(52) U.S. Cl.
  CPC ............ *G01B 5/008* (2013.01); *B29C 64/112* (2017.08); *G01B 21/04* (2013.01)

(58) Field of Classification Search
  CPC ...... G01B 5/008; G01B 7/008; G01B 11/005; G01B 21/04
  (Continued)

(56) References Cited

U.S. PATENT DOCUMENTS 4,631,834 A * 12/1986 Hayashi ................. G01B 5/008
  33/1 M
4,875,177 A * 10/1989 Jarman ................. G01B 21/042
  33/504

(Continued)

FOREIGN PATENT DOCUMENTS

CN         1987344 A    6/2007    ............. G01B 11/00
CN       103231513 A    8/2013    ............. B29C 67/00
(Continued)

OTHER PUBLICATIONS

International Searching Authority, Notification of Transmittal of International Preliminary Report on Patentability—International Application No. PCT/US14/71177, dated Feb. 5, 2016, together with the Written Opinion of the International Searching Authority, 25 pages.

(Continued)

*Primary Examiner* — Christopher Fulton
(74) *Attorney, Agent, or Firm* — Sunstein Kann Murphy & Timbers LLP

(57) ABSTRACT

Method for building up an object (25) by means of a coordinate measuring machine (10), wherein the coordinate measuring machine (10) has at least one control unit and one drive unit for the controlled movement of an instrument carrier (19) in relation to a base (12) and the instrument carrier (19) is implemented for carrying at least one measuring sensor and production tool (21*a*-*b*), which are each modularly attachable in particular, both alone in each case or in combination. In the scope of the method, based on digital model data which represent the object (25), controlled guiding and in particular alignment of the production tool (21*a*-*b*) carried in this case by the instrument carrier (19) and precisely-positioned material application and/or fixation, controlled in dependence on a respective production tool position and in particular alignment, by means of the pro- (Continued)

duction tool (21*a-b*) are performed, in particular wherein building up the object (25) is performed by layer-by-layer material application and/or fixation.

19 Claims, 3 Drawing Sheets

(58) Field of Classification Search
USPC .......................................................... 33/503
See application file for complete search history.

(56) References Cited

U.S. PATENT DOCUMENTS

| | | | | |
|---|---|---|---|---|
| 5,251,156 | A * | 10/1993 | Heier | G01B 11/005 33/503 |
| 5,388,342 | A | 2/1995 | Garau et al. | |
| 5,402,582 | A | 4/1995 | Raab | |
| 5,778,548 | A | 7/1998 | Cerruti | 33/503 |
| 6,180,049 | B1 | 1/2001 | Jang et al. | 264/401 |
| 6,238,112 | B1 * | 5/2001 | Girones | B41J 2/2139 347/19 |
| 6,259,962 | B1 * | 7/2001 | Gothait | B29C 41/36 700/118 |
| 6,347,257 | B1 * | 2/2002 | Bedal | B29C 41/12 700/118 |
| 7,127,825 | B2 * | 10/2006 | McMurtry | G01B 21/047 33/503 |
| 7,665,219 | B2 * | 2/2010 | Styles | G01B 5/012 33/503 |
| 7,676,945 | B2 * | 3/2010 | Prestidge | G01B 5/012 33/559 |
| 7,693,325 | B2 * | 4/2010 | Pulla | G01B 21/04 33/503 |
| 7,881,896 | B2 * | 2/2011 | Atwell | B25J 9/1692 702/150 |
| 8,352,212 | B2 * | 1/2013 | Fetter | G01B 5/008 33/503 |
| 8,875,655 | B2 | 11/2014 | Pettersson et al. | 118/713 |
| 9,039,917 | B2 | 5/2015 | Szuromi et al. | 216/102 |
| 9,127,929 | B2 | 9/2015 | Siercks et al. | |
| 9,242,031 | B2 | 1/2016 | Bonassar et al. | A61L 27/52 |
| 9,541,385 | B2 | 1/2017 | Jonas et al. | G01B 21/045 |
| 9,649,811 | B2 | 5/2017 | Napadensky | B29C 67/0059 |
| 9,662,840 | B1 | 5/2017 | Buller et al. | B29C 67/0088 |
| 9,669,586 | B2 | 6/2017 | Page | B29C 67/0088 |
| 2001/0017085 | A1 | 8/2001 | Kubo et al. | 101/35 |
| 2004/0251581 | A1 | 12/2004 | Jang et al. | 264/497 |
| 2007/0228592 | A1 | 10/2007 | Dunn et al. | 264/40.4 |
| 2008/0252671 | A1 | 10/2008 | Cannell et al. | 347/9 |
| 2013/0101729 | A1 | 4/2013 | Keremes et al. | 427/8 |
| 2015/0061170 | A1 | 3/2015 | Engel et al. | 264/40.1 |
| 2015/0144496 | A1 | 5/2015 | Morris et al. | 205/261 |
| 2015/0300798 | A1 * | 10/2015 | Pettersson | G01B 21/04 33/503 |

FOREIGN PATENT DOCUMENTS

| | | | | |
|---|---|---|---|---|
| CN | 203109234 U | | 8/2013 | ............. B22F 3/105 |
| DE | 4 325 347 A1 | | 2/1994 | |
| DE | 43 25 337 A1 | | 2/1994 | |
| DE | 10 2005 061 464 A1 | | 7/2007 | |
| DE | 10 2013 217 422 A1 | | 3/2015 | ............. G01B 5/008 |
| EP | 1 474 650 B1 | | 6/2007 | |
| EP | 2 037 214 A1 | | 3/2009 | |
| EP | 2 641 661 | | 9/2013 | ............. G01C 11/06 |
| EP | 2 705 935 A1 | | 3/2014 | |
| FR | 2 738 343 A1 | | 3/1997 | |
| WO | WO 2004/024447 | | 3/2004 | |

OTHER PUBLICATIONS

International Searching Authority, International Search Report—International Application No. PCT/US2014/071177, dated Mar. 19, 2015, together with the Written Opinion of the International Searching Authority, 12 pages.

Martin Beyfuβ, Examiner European Patent Office, European Search Report—Application No. 13199065.7, dated May 22, 2014 (2 pages).

Creuzer et al., U.S. Appl. No. 14/575,300, filed Dec. 18, 2014, 37 pages.

* cited by examiner

COORDINATE MEASURING MACHINE HAVING HIGH-PRECISION 3-D PRINTING FUNCTIONALITY

Illustrative embodiments of the invention relate to a method for building up an object using a coordinate measuring machine (CMM) and to a coordinate measuring machine provided for this purpose. In illustrative embodiments, the coordinate measuring machine has at least one control unit and one drive unit for the controlled movement of an instrument carrier in relation to a base. The instrument carrier is configured to carry at least one measuring sensor. The CMM may provide a surface scanning mode for determining at least one measurement point position on a surface by touching the surface by means of the measuring sensor. The instrument carrier may carry a production tool for material application and/or fixation. The CMM may provide an object buildup mode that is controlled based on digital model data. The production tool may be guided and aligned by means of the production tool. Material can be applied and/or fixed in a precisely-positioned manner depending on a respective production tool position. By executing the object buildup mode, the object can be built up layer-by-layer, based on the digital model data.

In many technical fields of application, the need exists for surveying surfaces of objects and therefore also the objects themselves with high precision. This applies in particular for the manufacturing industry, for which the surveying and checking of surfaces of workpieces has high significance, in particular also for purposes of quality control.

For these applications, coordinate measuring machines are typically used, which enable precise surveying of the geometry of an object surface, typically with micrometer precision. Objects to be surveyed can be, for example, engine blocks, transmissions, and tools. Known coordinate measuring machines survey the surface by producing a mechanical contact and scanning the surface. Examples of these are gantry measuring machines, as described, for example, in DE 43 25 337 or DE 43 25 347. Another system is based on the use of a jointed arm, the measuring sensor of which, which is arranged at the end of the multipart arm, can be moved along the surface. Jointed arms of the type in question are described, for example, in U.S. Pat. No. 5,402,582 or EP 1 474 650.

In the prior art, a tactile sensor is used as a standard measuring sensor with such coordinate measuring devices, said tactile sensor consisting, for example, of a ruby sphere which is mounted on a measuring rod. The deflection of the tactile sensor, in the case of a coordinate measuring machine designed for three-dimensional measurements in three directions X, Y, and Z perpendicular to one another, is determined during the scanning via a switch element or path-measuring element. The location of the contact and therefore the surface coordinates are calculated on the basis of the switching point or deflection path.

To reconstruct the surface profile from the measured data, the mechanical dimensions of the sensor itself and its alignment during the contact with the object surface must be considered. The sensor is implemented having a measuring tip of known geometry, typically spherical or, for special applications, ellipsoidal, typically having a (main) radius in the order of magnitude of several millimeters. The term "measuring tip" is to be understood in conjunction with the present invention in general as a (tactile) measuring sensor of any arbitrary shape and dimension, wherein it does not necessarily have to (but can) have a shape tapering to a point. The raw data measured using the coordinate measuring machine while using a tactile sensor represent the measured location coordinates of a reference point of the measuring tip, for example, of the measuring tip center.

Furthermore, approaches for contactless surveying, in particular using optical sensors, are known in the prior art. By means of such an optical sensor, surface topographies can be surveyed very precisely using an emitted measurement light beam, in particular laser beam. The resolution for surveying surface profiles using optical measuring sensors can be significantly higher than those using tactile measuring sensors. Optical sensors introduced in the meantime into measurement technology using coordinate measuring machines are based, for example, on emission of laser light onto an object surface for interferometric measurements (EP 2 037 214). Methods based on white light interferometry (DE 10 2005 061 464) and chromatic-confocal methods (FR 273 8343) have also been proposed.

One disadvantage in the surveying and production method for workpieces is that in the case of the establishment of a deviation of the structural dimensions of the already finished workpiece from predefined target values and tolerances, the workpiece is typically to be regarded as a reject and therefore is to be discarded. In the scope of the surveying step using the coordinate measuring machine, generally further intervention in the production process cannot be taken and therefore a corresponding adaptation of the workpiece cannot be performed. Such surveying is typically performed after the finishing of the workpiece. In other words: the finished product is not to be altered once again in this surveying stage but is considered to be finished in either a correct or flawed manner. Reworking on a flawed workpiece is only to be implemented in this context with substantial additional effort.

The production of the workpiece per se represents a further disadvantage in this context. Thus, for example, for a comparatively small change of the workpiece shape and/or size, a great effort for corresponding adaptation of the production process (for example, the tools required for this purpose) can be necessary. If it is repeatedly established during a survey, for example, that the produced piece does not correspond to the specifications (for example, because of a tool flaw), a complex and time-consuming tool adaptation can thus be rapidly required.

Furthermore, it is to be noted with regard to the workpiece production that it is typically linked to low flexibility in the case of a required high manufacturing precision, which remains at least equal.

It is therefore the object of the present invention to provide a device and a corresponding method for workpiece production having a precise monitoring ability which is progressive with regard to the manufacturing precision.

Furthermore, it is an object of the invention to provide a corresponding device, by means of which variable and flexible workpiece production is enabled, wherein improved manufacturing precision is provided, in particular wherein the precise monitoring ability of the production progress is provided.

This object is achieved by the implementation of the characterizing features of the independent claims. Features which refine the invention in an alternative or advantageous manner can be inferred from the dependent patent claims.

The invention relates to a coordinate measuring machine (CMM), which is implemented for the structural buildup of a three-dimensional object. The structural buildup is implemented in this case by means of a layer-by-layer material application and/or material fixation. In addition to a measuring mode for the high-precision surveying of an object located in the measurement volume of the machine using a measuring sensor, which can be carried by the instrument carrier of the CMM (typically corresponds to a measuring head of the CMM), the CMM has a correspondingly executable object buildup mode for the object buildup, wherein a production tool, for example, a printing head, is carried by the instrument carrier for the material application and/or material fixation. The production tool is therefore arranged for this purpose on the instrument carrier and can be freely positioned, guided, and in particular can be freely aligned— for example, if the CMM has a pivotable instrument carrier—within the measurement volume by means of the machine structure (guides and drives). A positioning precision corresponding to that for the positioning of the measuring sensor for the point measurement by means of the CMM can thus be achieved for the production tool and therefore an object buildup can also be executed with such high precision.

For the object buildup by means of material application, for example, a first layer made of liquid or sprayable material (for example, plastic or metal) is discharged and— in particular after a specific drying time—a further layer of the material is applied to the first. This operation is repeated in such a way until the object is finished according to an existing object model. The respective applied materials and/or the times until the application of a new layer are preferably selected so that a solid bond is formed between the layers and an integral object is thus producible.

Alternatively—for example, if two non-coherent structures are to be formed—the application times can be set in such a manner that no material bond results and two adjoining layers are provided, possibly having contact, but structurally non-bonded (separated), i.e., a corresponding application pause takes place, for example.

The production tool is preferably equipped with a nozzle for the material application, through which the material can be sprayed out, wherein the layer thickness and/or the homogeneity with regard to the planar material distribution can be defined by the specific embodiment of the nozzle and a flow speed of the material through the nozzle. The layer thickness is additionally dependent on the guide speed of the instrument carrier (i.e., of the production tool) during the material application. The material supply can be established via corresponding supply channels, which are connected to the nozzle and a storage container, which stores the material.

A radiation emitter is arranged as a production tool on the instrument carrier, for example, for the object buildup by means of material fixation. The radiation source can also be provided on the instrument carrier in this case. Alternatively thereto, the radiation which can be emitted by the emitter can be guided by means of an optical guide, for example, a fiber, from an external source to the emitter.

For the material fixation, the material to be fixed (from which the object is to be manufactured) is provided in a thin layer, for example, in the measurement volume of the CMM, in particular on the base. The material is in this case, for example, a plastic powder or a viscous plastic liquid. Radiation, for example, oriented UV radiation or laser radiation, is emitted onto the thin material layer, whereby the material is locally fixed or solidified in the region of incidence of the radiation (at least partially solidified, so that the following layer remains able to be permanently bonded to the first layer). For example, UV cross-linking of the plastic liquid (by action of the UV radiation) or fusing of powder particles (by action of the laser radiation) occurs in this case. Subsequently, a further layer is applied to the already irradiated layer and in turn irradiated accordingly for the fixation.

According to the invention, a combination of both methods can also be performed, wherein in particular firstly the material is applied and subsequently it is fixed.

The invention therefore relates to a method for building up an object by means of a coordinate measuring machine, wherein the coordinate measuring machine has at least one control unit and one drive unit for the controlled movement of an instrument carrier in relation to a base. The instrument carrier is implemented for carrying at least one measuring sensor and production tool, which are each modularly attachable in particular, both alone in each case or in combination. In the scope of the method, based on digital model data which represent the object, controlled guiding and in particular alignment of the production tool carried in this case by the instrument carrier and precisely-positioned material application and/or fixation, controlled in dependence on a respective production tool position and in particular production tool alignment, by means of the production tool are performed, in particular wherein building up the object is performed by layer-by-layer material application and/or fixation.

In the scope of the invention, furthermore in particular surface scanning is executed with a position determination for at least one measurement point by means of the measuring sensor, which is carried by the instrument carrier, in particular arranged on the production tool, in particular wherein the measuring sensor is implemented as a tactile or optical sensor. The high-precision surface surveying of objects which is typical for a coordinate measuring machine of the type in question is thus provided. The measuring sensor attached to the CMM structure can thus be positioned in this case by means of the drive unit and control unit with micrometer precision ($\pm 1$-$10$ µm).

The measurement point, for which the position determination is executable, is embodied in this case in particular by a surface point
- of the at least partially built-up object, wherein the material application in the scope of building up the object is adapted, in particular corrected, in an automatically controlled manner in dependence on the position of the measurement point and on the digital model data for the object, or
- of a pattern object, wherein the digital model data are produced and/or updated in dependence on the surveying of the pattern object, or
- of a previously known reference body, wherein in the scope of the method, an updating step is performed having a referencing of the instrument carrier position on the basis of the position determined on the reference body for the measurement point.

With regard to the precision provided by the invention for the buildup of the object, according to one embodiment of the invention, building up the object is performed by the precisely-positioned material application and/or fixation with a precision corresponding to the position determination for the at least one measurement point in the scope of the surface scanning executable by the coordinate measuring machine (micrometer precision), in particular with a corresponding positioning precision for the production tool. In particular, the material application and/or fixation is performed with a precision corresponding to the positioning precision of the measuring sensor or the measurement precision of the coordinate measuring machine.

In this way, very high dimensional and structural precision is provided for the preparation of an object from the applied and/or fixed material, wherein moreover an arbitrary object can be flexibly selected from a set of different objects to be produced by the respective selection of the digital model data. In this case, a change of the object to be respectively prepared is possible at any time without precision losses.

In the scope of a further embodiment of the invention, a buildup of a base structure of the object is performed by coarse application of the material by means of the production tool and an adaptation of the base structure of the object is performed by precisely-positioned surface modification of the at least partially built-up base structure.

The object is therefore prepared in two stages. Firstly, a coarse preparation of the base structure is performed, which is more rapid in comparison because of this, however, and then a correspondingly more precise adaptation of the base structure is performed. Both process steps are executed based on the digital model data.

In particular, in the scope of the adaptation of the base structure a precisely-positioned fine application of the material, or an alternative material, for precise surface structuring by means of the production tool is performed, in particular wherein the production tool is implemented as a printing head or has a printing head, and/or a surface ablation is performed by means of a modification tool, in particular a milling tool or processing laser, wherein the instrument carrier or the production tool carries the modification tool.

In particular, a coarse application printing unit is provided for the coarse application and a fine application printing unit is provided for the fine application, wherein the coarse application printing unit and the fine application printing unit are arranged on the instrument carrier or the production tool has the coarse application printing unit and the fine application printing unit. In this case, in particular an automatic change of the use of the printing units can be performed in dependence on the application to be executed.

Different approaches are therefore provided for the buildup and adaptation of the object. In particular, after buildup of the base structure, it can be built up further and/or thus finalized by a material application in finer, i.e., more precise form. In this case, for example, an optimized surface property, for example, with respect to a roughness or in regard to a surface material, can be achieved. Furthermore, smaller-dimensioned structure parts of the object can be prepared precisely in this way.

A material ablation can also be performed after buildup of the base structure. For example, inaccuracies produced during the material application—for example, identified by surveying the already prepared base structure—can thus be reduced or removed. In addition, the material ablation can also be part of the planned production process, for example, to be able to produce a specific object structure more efficiently (more rapidly).

A further aspect with regard to the object buildup by material application by means of a printing head or a printing unit—according to a specific embodiment of the invention—relates to the acceleration of the printing process by active cooling of the applied material, in particular of applied liquid plastic. The instrument carrier or the printing head has for this purpose a cooling nozzle, by means of which cool air is blown onto the applied material and thus cools the material. Therefore, a plastic layer which was just applied can be cooled more rapidly so that, for example, the next layer can also be applied more rapidly. The cooling nozzle can be supplied, for example, by the compressed air available in any case for the operation of the CMM.

According to one specific embodiment of the invention, in the scope of the method, positioning of a defined rough body in a specific alignment and positioning with respect to the base and within a measurement volume, which is defined by the mobility of the instrument carrier (i.e., by the structural design of the coordinate measuring machine) is performed, in particular wherein the positioning is performed by means of a transport tool attachable to the instrument carrier or production tool. Building up the object is performed by means of precisely-positioned material application on the rough body by means of the production tool.

Therefore, for example, a base structure for the object can be placed on the base and the finalization of the object can be performed by means of controlled material application. Thus, in particular large-volume objects can be produced in comparatively shorter processing time. Furthermore, the rough body can be embodied by a hollow body, for example, whereby material can in turn be saved and the weight of the resulting object can be optimized (for example, reduced) or the weight distribution can be adapted.

Such a rough body can be placed, for example, before beginning the printing process or the object buildup process, by means of a transport tool on the table of the CMM. The transport tool is attached or provided for this purpose on the instrument carrier or is also provided by the printing head. The transport tool is implemented in particular so it is modularly attachable on the instrument carrier or on the production tool. The transport tool can be implemented, for example, as a gripper and/or can be based on a mechanical or magnetic carrying or connection mechanism or a carrying or connection mechanism based on the partial vacuum principle. A corresponding rough body can be placed and kept ready for this purpose, for example, on the edge of the CMM, received (i.e., carried away) by the transport tool, and placed on a predetermined and in a predetermined alignment on the table of the CMM. It is apparent that such rough bodies can be kept ready in different sizes and shapes.

According to one specific embodiment, the instrument carrier is aligned in dependence on the execution of the buildup or the adaptation of the base structure in such a manner that the production tool or the modification tool is aligned in a defined manner in a working alignment, which is provided for the material application or for the surface modification, in relation to the object surface, in particular wherein the instrument carrier carries at least two printing heads. The respective tool is aligned in particular perpendicularly to the surface or the surface to be prepared in this case.

In the scope of the method, according to a further embodiment of the invention, the production tool is guided along a defined path, wherein the path is derived from the digital model data.

The coordinate measuring machine, using which the method according to one of the above embodiments is executed, is implemented in particular according to one of the following embodiments according to the invention for the coordinate measuring machine.

The invention thus additionally relates to a coordinate measuring machine having at least one control unit and one drive unit for the controlled movement of an instrument carrier in relation to a base, wherein the instrument carrier is implemented for carrying at least one measuring sensor and wherein the coordinate measuring machine provides a surface scanning mode for determining at least one measurement point position on a surface by touching the surface by means of the measuring sensor carried in this case by the instrument carrier.

According to the invention, the instrument carrier is furthermore implemented for carrying a production tool implemented for material application and/or material fixation. The coordinate measuring machine additionally provides an object buildup mode defined in that in the scope thereof, controlled based on digital model data, at least the production tool carried in this case by the instrument carrier can be guided and in particular aligned and by means of the production tool, material can be applied and/or fixed in a precisely-positioned manner in dependence on a respective production tool position and in particular production tool alignment, so that by executing the object buildup mode, in particular controlled by the control unit, the object can be built up, in particular layer-by-layer, based on the digital model data.

The digital model data are provided in this case in particular in a corresponding memory unit, wherein this memory unit is implemented, for example, as a server unit and the data are transmittable to and from this server unit (for example, via Internet), or wherein the memory unit is embodied by a data cloud. Alternatively or additionally, the memory unit can also be associated with the coordinate measuring machine and the data are provided directly therein.

According to one specific embodiment of the invention, the production tool is embodied as a printing head implemented for material application and/or as a laser emitter for emitting a laser beam for material fixation, in particular by laser sintering. The material can therefore be discharged, for example, sprayed, by means of the printing head. By way of the emission of a laser beam, for example, onto a material to be solidified, for example, plastic powder, the material can be fused and thus bonded and solidified by following cooling.

According to a further specific embodiment of the coordinate measuring machine according to the invention, the production tool has a coarse application printing unit and a fine application printing unit, and also in particular the measuring sensor. During execution of the object buildup mode, in this context in particular—in a first phase of the object buildup mode—a base structure of the object is prepared using the coarse application printing unit and—in a second phase of the object buildup mode—a surface adaptation of the base structure is executed by means of the fine application printing unit.

With respect to the achievable precision for building up the object, according to one embodiment of the invention, the production tool can be guided and positioned, in particular aligned, with a positioning precision provided in the scope of the surface scanning mode for the measuring sensor. The production tool, for example, the printing head, can thus be guided and placed with a CMM precision typical for coordinate measuring machines, whereby a corresponding (dimensional and shape) precision is implementable for the object to be built up. For example, a production tool position can be set or approached with a position uncertainty (with respect to the CMM coordinate system) of <50 µm, in particular <10 µm.

In regard to possible embodiments for building up the object, according to one embodiment, a defined rough body can be placed in a specific alignment and positioning with respect to the base and within a measurement volume, which is defined by the mobility of the instrument carrier, wherein the object can be built up by the precisely-positioned material application on the rough body, in particular by layer-by-layer material application.

According to one specific embodiment of the invention, the instrument carrier is furthermore implemented for carrying a modification tool, which is modularly attachable in particular, in particular a milling tool or processing laser, and the coordinate measuring machine has an object modification mode defined in that in the scope thereof, in particular by the execution thereof, the object surface can be processed in a controlled manner by means of the modification tool carried by the instrument carrier, in particular wherein a material ablation is performed.

According to further specific embodiments of the invention, the production tool has the measuring sensor and/or a modification unit embodying the modification tool and/or a cooling nozzle (for more rapid cooling of applied material by means of a cold air flow). Alternatively or additionally, the instrument carrier is embodied as pivotable about at least one axis and/or is implemented for simultaneously carrying at least the measuring sensor and the production tool.

In particular, in the scope of the invention, the digital model data can be generated at least partially by executing the surface scanning mode.

With respect to the material provision for building up the object, the coordinate measuring machine has, according to one preferred embodiment of the invention, material guiding means for providing and/or transporting the material for building up the object, in particular a tubular line structure and/or a temperature-controlled pipe arrangement, in particular wherein the material guiding means are connected to the production tool and the material supply for the production tool for the material application is thus provided and/or wherein the material guiding means have an insulation or damping device with regard to a reduction of the heat emission, in particular thermal radiation.

The invention additionally relates to a computer program product, which is stored on a machine-readable carrier, for controlling or executing an above-described method, in particular when the computer program product is executed on a control and processing unit of a mentioned coordinate measuring machine.

The method according to the invention and the device according to the invention are described in greater detail hereafter solely as examples on the basis of concrete exemplary embodiments which are schematically illustrated in the drawings, wherein further advantages of the invention are also described. In the specific figures:

FIG. 1 shows an embodiment of a coordinate measuring machine 10 (CMM) according to the invention, implemented in the example as a gantry coordinate measuring machine.

Figure 1:
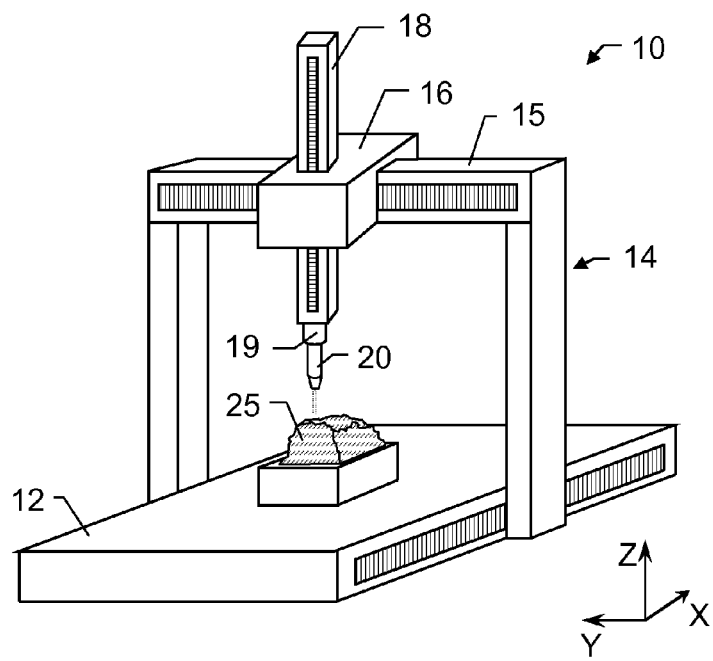
FIG. 1 shows a first embodiment of a gantry coordinate measuring machine according to the invention having a printing head.

The coordinate measuring machine 10 has a base 12, on which a gantry 14 is arranged in such a manner that it is movable in a longitudinal direction (Y direction). The gantry 14 has two gantry girders, a bridge 15, and a rod or Z column 18, wherein the gantry girders are connected to one another at their upper ends via the bridge 15.

A carriage 16 is arranged on the bridge 15, which is movable along the bridge 15, i.e., in a spatial direction (X direction) connecting the two gantry girders. The Z column 18 is movable in a third spatial direction (Z direction) and is guided in a receptacle of the carriage 16. For this movement in the Z direction, the Z column 18 is guided in bearings, which are components of the carriage 16. In particular, the three spatial directions X, Y, and Z are aligned perpendicular to one another, although this is not a prerequisite for the present invention.

The coordinate measuring machine 10 is implemented for three-dimensionally building up an object 25 and also for determining one or a plurality of measurement points on an object 25 and therefore has three linear guides having drives to enable the movement of an instrument carrier 19, which is arranged on the Z column 18 on its lower free end facing toward the base 12, in the three spatial directions X, Y, and Z in relation to the base 12.

Each of the linear drives has an associated measuring element for position determination in the associated guide direction, for example, three measuring bars for position determinations in the X, Y, or Z direction, respectively.

The instrument carrier 19 is implemented for modularly receiving at least one measuring sensor, wherein the measuring sensor can be implemented, for example, as an optical or tactile sensor for determining positions of measurement points on the object 25. Optical sensors enable in this case a contactless distance determination to a measurement point on the object 25, while a mechanical contact to an object surface to be surveyed is established using a tactile sensor.

Figure 2:
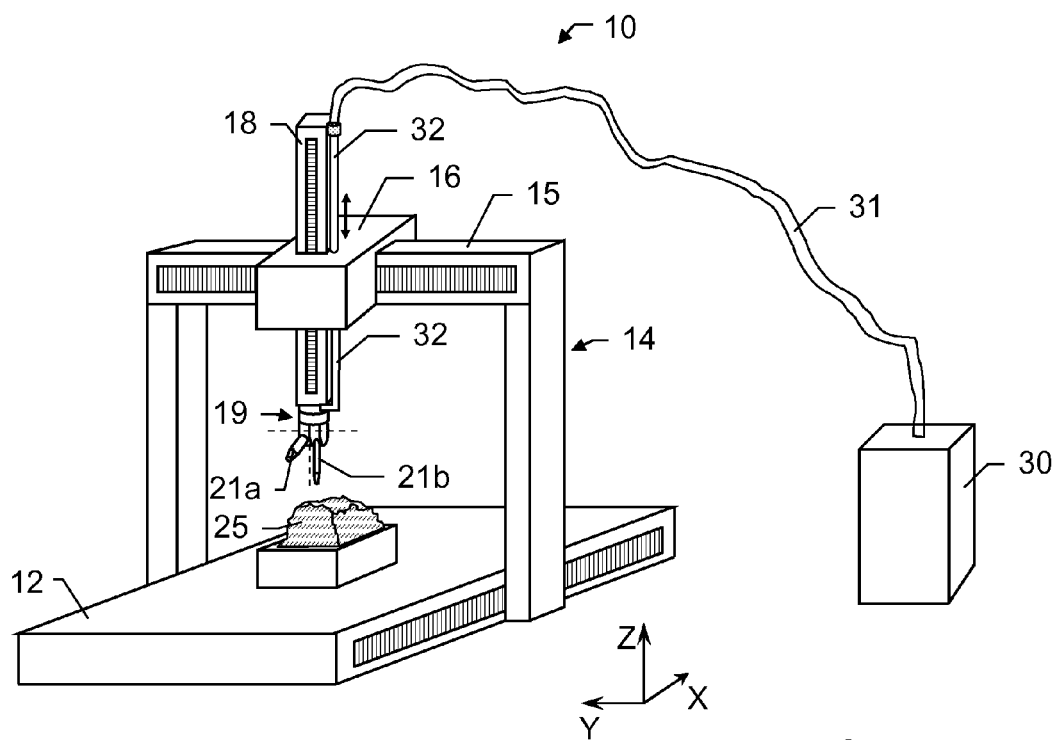
FIG. 2 shows a further embodiment of a coordinate measuring machine according to the invention having pivotable instrument carrier.

According to an alternative embodiment according to the invention, the instrument carrier 19 can be implemented as an instrument carrier 19 pivotable about at least one axis (cf. FIG. 2).

The integration of a micro-adjuster, for example, in the form of a piezo drive or scanner mirror, within the measuring sensor is also conceivable. In this case, for example, a slight possible resonant vibration of a light-emitting stylus (measuring sensor) would be possible.

With regard to the embodiment of the coordinate measuring machine 10, the invention is not restricted to a gantry structure as shown in FIG. 1. Rather, any known type of coordinate measuring machines which enables object surface surveying using an optical sensor is suitable for the invention (cf. FIGS. 5-6).

The coordinate measuring machine 10 additionally has a control and processing unit (=control unit; not shown), having a processor. By means of the control and processing unit, in particular the drives of the coordinate measuring machine 10 are activated and the measured data are stored and processed. The control and processing unit is preferably implemented to enable fully automatic surveying of object surfaces.

For purposes of direct user interventions or direct user control, the control and processing unit can also be connected to a user console, in particular wirelessly, for example, via radio or WLAN.

According to the invention, the instrument carrier 19 is implemented for the purpose of receiving a printing head 20. In the embodiment according to the invention which is shown, such a printing head 20 is arranged on the instrument carrier 19. By means of this printing head 20, the object 25 can be "printed", i.e., the object 25 can be built up or prepared (in particular layer-by-layer).

For this purpose, the printing head 20 is moved into a specific printing position (by means of the guides and drives) and a material provided for producing the object 25, for example, is applied in this position. The application of the material is performed progressively in particular during a movement of the instrument carrier along a predetermined printing path. The printing position and the printing path for the positioning of the instrument carrier 19 or the printing head 20 are ascertained, for example, based on a digital model for the object 25 to be produced and are approached in a manner controlled by the control and processing unit. The application of the material is also controlled by this unit. In particular the flow rate and the spray pressure for the application (for example, by spraying out) of the material and the speed for the movement of the instrument carrier 19 are controlled in the process.

The object 25 is, for example, printed directly on the table (i.e., the base) of the coordinate measuring machine 10, wherein the table has an (anti-adhesion) coating suitable for the material for this purpose in particular. Alternatively, a carrier layer or a carrier object (rough body) is placed or can be placed on the base and the object 25 is built up on this carrier.

The layer-by-layer buildup of the object 25 is implemented in this case, for example, in that a first (base) layer is applied, the layer thickness of which is dependent on the material throughput of the printing head 20 and the relative movement speed of the printing head 20 (in relation to the object 25), and the next layer is applied with a specific time delay onto the first layer. The time delay can be selected in this case in such a manner that the first layer is already slightly "dried", in particular begins to be slightly cured or cross-linked, but does not yet have a composition such that a bond arises between the first layer and the next layer (for example, by way of chemical reaction or physical effects), and thus a durable solid and integral object 25 is producible.

For the above-mentioned printing (=buildup) of the object 25, the coordinate measuring machine 10 has a corresponding printing mode (=object buildup mode), during the execution of which the printing head 20 is fastened on the instrument carrier 19. The printing head 20 can be modularly fastened on the instrument carrier 19 or detached therefrom. The printing head 20 can therefore be replaced by a measuring sensor, for example, and the object 25 can be surveyed in a corresponding measurement mode. A replacement station having a plurality of receptacles for the various tools can be provided for such a replacement of the tool on the instrument carrier 19.

According to the invention, arbitrary three-dimensional geometries (=workpieces, objects), in particular having undercuts, can therefore be produced using the coordinate measuring machine 10.

FIG. 2 shows a further embodiment of a coordinate measuring machine 10 according to the invention. Similarly to FIG. 1, this relates in this case to a gantry machine having base 12, gantry girders, bridge 15, and Z column 18. Furthermore, a guide and drive unit is again provided for the provision of a movement of the instrument carrier 19 in relation to the base 12 in three directions (X, Y, and Z direction).

The instrument carrier 19 is embodied as pivotable in this case, wherein two printing units 21*a-b* are arranged thereon for the material application. The two printing units 21*a-b* can alternatively be combined to form a common printing head (not shown here), so that the printing head is arranged on the instrument carrier 19 and the printing units 21*a-b* are provided on the printing head and are pivotable in particular.

The printing units 21*a-b* are a coarse application printing unit 21*a* and a fine application printing unit 21*b*, wherein a base structure of the object 25 can be built up or printed by means of the coarse printing unit 21a, i.e., the object can be prepared (prefinished) in its coarse form by means of this unit 21a. After the preparation of the base structure, the object 25 to be produced is still to be finalized to fulfill the desired precision requirements, for example. For this purpose, a corresponding fine application step is executable using the fine printing unit 21b, in which in particular the surface and/or small structures of the object 25, i.e., the already existing base structure of the object 25, are adaptable and definable with greater precision.

The coarse application printing unit 21a has for this purpose in particular a design such that in comparison to the fine application printing unit 21b, on the one hand, a greater material throughput (material which can be discharged per unit of time), but a lower precision thus caused with respect to the position-related application of the material is achievable.

In this context, the printing units have, for example, different nozzle cross sections (=exit opening for the material on the printing unit) and/or have different pressure applied thereto, i.e., the material is guided and discharged with differing pressure through the respective printing unit.

Depending on the process step (coarse or fine application), the respective printing unit 21a or 21b provided for this step is aligned in such a manner that the material is applied at a predetermined angle in relation to the base 12. Depending on the buildup progress for the object 25, the respective printing nozzle is aligned in particular at a defined angle in relation to the already produced surface of the object 25, in particular orthogonally.

Using the variably fine application stages available by way of the two printing units 21a-b, on the one hand, a rapid buildup of the base structure of the object 25 can be performed and, in addition, the surface can be formed having a comparatively low roughness by the fine application. A significant improvement can thus also be achieved with respect to the shape precision of the resulting object, since in particular the effect of thermal shrinking—caused by cooling of the material after application—can be reduced or avoided.

According to a specific embodiment (not shown here), the material exit of the fine application printing unit 21b can be implemented as spherical for the homogeneous distribution, which is as comprehensive as possible, of the material.

Furthermore, a material container 30 or a material reservoir 30 is provided, in which the material, from which the object 25 is to be produced, is kept ready or stored. This material provision unit 30 is connected by a material guide 31, for example, an insulated and/or temperature-controlled tubing line, to the coordinate measuring machine 10. The coordinate measuring machine 10 has a pipeline 32 for the material guiding, which is connected to the instrument carrier 19 and therefore provides the material transport from the material provision unit 30 via the instrument carrier 19 up to the printing head or the respective printing units 21a-b. The pipeline 32 can be guided through the carriage 16—as shown here—so that during a movement of the Z column 18, the pipeline 32 is correspondingly also guided in the Z direction.

The printing head or the printing units 21a-b are designed for this purpose in such a manner that if the printing head or the printing units 21a-b is/are arranged between instrument carrier and printing unit, a connection exists for the material transport. A modularly detachable plug-in system can be provided for this purpose, for example.

By providing a material container 30 which is structurally separated from the CMM 10 (a connection exists essentially solely through the material guide 31), a possible introduction of heat into the device structure of the CMM 10 is advantageously reduced or entirely avoided by the temperature control of the raw material to be applied (in the material container 30). Heat-related positioning errors can thus be reduced accordingly or entirely avoided.

According to an alternative embodiment, the pipeline 32 can be directly connected to the printing head or the respective printing units 21a-b and the material provision can thus be performed directly, i.e., without a transport through the instrument carrier 19.

Furthermore, the tubing supply line 31 is suspended in such a manner and is actively or passively guided in relation to the base 12 in such a manner (in particular similarly to the movement of the Z column 18) that the CMM 10 thus has the least possible weight applied thereto and therefore the error influence with regard to the precise positioning of the instrument carrier 19 due to the material supply can be kept as small as possible, in particular can be avoided.

A printing head which has the two printing units 21a-b has in particular a switchover mechanism, by means of which the path of the material flow, i.e., toward the coarse application printing unit 21a or toward the fine application printing unit 21b, can be controlled and switched over. Alternatively, the instrument carrier—for the direct arrangement of the printing units 21a-b thereon—can have a corresponding material flow control unit.

The material provision unit 30 and/or the coordinate measuring machine 10 has/have in particular electronically controllable conveyance means, in particular a pump, for the material conveyance.

For example, liquefied plastic (for example, a polymer or polymer mixture) or liquefied metal, which solidifies upon cooling, is used as a material for building up the object 25. The degree of the liquefaction, i.e., the viscosity, of the material can be set, for example, by defined temperature control of the material. This is set in particular in dependence on the properties to be achieved or on the shaping of the resulting object 25.

The present invention is not restricted to the above-described generative buildup of objects using the coordinate measuring machine by means of material application, but rather also relates to a coordinate measuring machine for object buildup by means of alternative methods, such as, for example, selective laser sintering or local material curing, for example, by means of UV radiation.

The instrument carrier 19 of the CMM 10 is equipped with a laser emitter for laser sintering to be executed, for example, so that a laser beam can be aligned precisely on a point and guided along a path.

Furthermore, a unit is additionally provided for material provision by means of production of a thin powder layer, for example, using a doctor blade. The thin powder layer is therefore produced over the entire surface area in particular and subsequently locally solidified by means of the laser, i.e., the particles are locally sintered or fused. By repeated execution of these steps, which build up on one another (for example, by lowering the last solidified structure), the workpiece can thus be produced. For example, polyamide, a plastic-coated molding sand, or a metal or ceramic powder is used as a powdered starting material.

The radiation source for the laser emitter can be provided externally, for example, i.e., not on the CMM 10, wherein the laser radiation is guided by means of an optical fiber to the laser emitter on the instrument carrier 19.

For local material curing, a UV radiation source, for example, is correspondingly arranged on the instrument carrier 19, the radiation of which can be aligned and focused in a precise position. The production material is furthermore provided as a liquid in a container such that, for example, the UV radiation can interact with the liquid. Similarly to the layer-by-layer buildup during the laser sintering, layer-by-layer curing of the material can also be achieved here by means of local incident radiation of the UV radiation and the object can thus be produced from the liquid by step-by-step immersion and UV curing of the solidified material.

Figure 3:
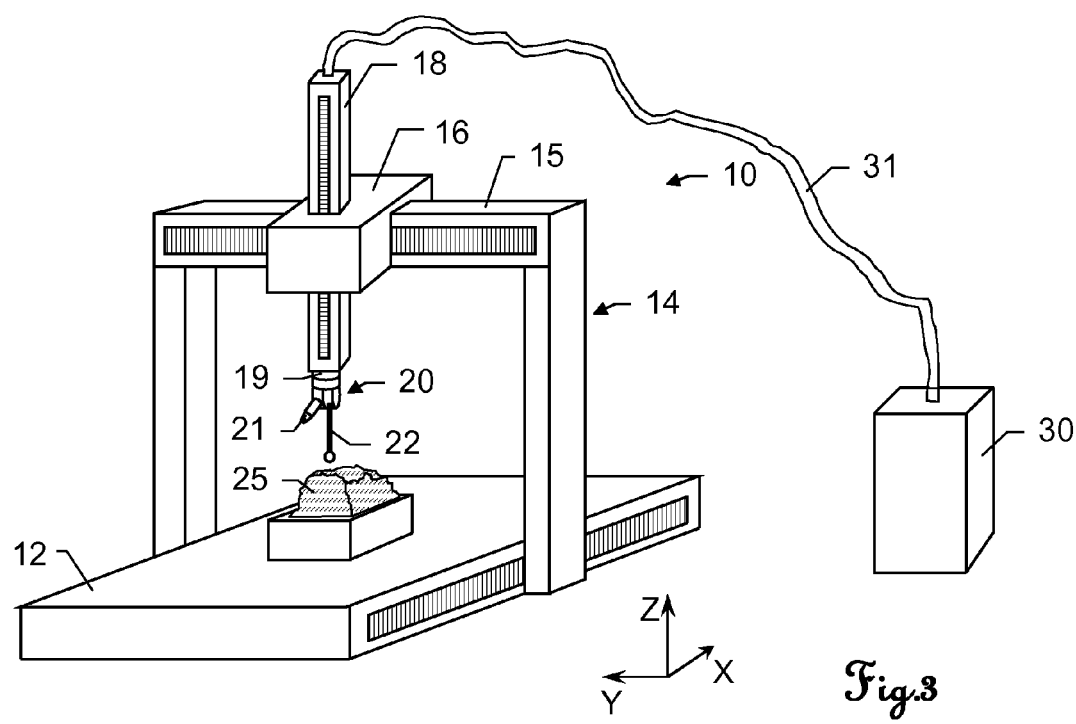
FIG. 3 shows a further embodiment of a coordinate measuring machine according to the invention.

FIG. 3 shows a further embodiment of a coordinate measuring machine 10 according to the invention. Similarly to FIGS. 1 and 2, this also relates here to a gantry machine having base 12, gantry girders, bridge 15, and sleeve 18 (=Z column). A guide and drive unit is additionally again provided for the provision of a movement of the instrument carrier 19 in relation to the base 12 in three directions (X, Y, and Z direction).

In addition, a material provision unit 30 having supply line 31 to the CMM 10 is provided. The supply line 31 is connected to the sleeve 18, so that the printing material can be guided in the interior of the sleeve 18 to the instrument carrier 19. Alternatively (not shown here, however), the supply line 31 can be connected at a suitable position to the gantry structure 14, wherein the gantry structure 14, the carriage 16, and the sleeve 18 each have a guide system for the material and the guide systems interact in such a manner that the material can be guided in the interior of these structures to the instrument carrier, in particular in any arbitrary position of the structures in relation to one another.

The instrument carrier 19 is implemented in such a manner that the material can also be guided to the printing head 20 by means of material guiding means implemented for this purpose and can be applied via the printing unit 21 for the object buildup.

The printing head 20 additionally has a tactile sensor 22. Using this sensor 22, the object 25 or individual measurement points on the object 25 can be surveyed by touching and position determination for the measuring probe 22 during the touching.

Such surveying of the object 25 can be performed, for example, to detect the dimensions of the object 25 and compare them to target data for the object 25. The target data can be provided, for example, by a digital model of the object 25. Thus, during the generative buildup of the object 25, the shape which has already been produced and size can be checked. This is preferably performed in individual process intermediate steps, i.e., the object 25 is prepared up to a defined stage, then the surveying of the object 25 is performed using the sensor 22, and subsequently the object is built up further and/or corrections are performed on the already at least partially produced object 25 (for example, by milling off or additional application of material by the modification tool) in dependence on the comparison of the measured data to the target data.

The dimensional precision of the resulting object 25 can be progressively monitored and improved by this surveying of the object 25.

According to an alternative embodiment (not shown here), the printing head 20 has, alternatively or additionally to the tactile sensor 22, an optical sensor which measures in a contactless manner, by means of which an object can be surveyed. For example, an interferometrically measuring sensor, a line scanner, or a triangulation sensor can be provided as an optical sensor.

A point cloud which represents the object can be produced comparatively rapidly in particular by scanning touching of the object surface, whereby the structure, shape, and dimension of the object are provided in a very precisely determined manner. Monitoring the progress with respect to the object buildup can therefore also be performed by the optical sensor.

In addition, by way of the precise optical detection of an object, a digital model (for example, CAD model) of the scanned object can be produced from the measured data and a corresponding object can be printed based on this digital model. The coordinate measuring machine 10 according to the invention having such functionalities therefore unifies the detection of the object, production of the digital model, and the preparation of a corresponding object based on the digital model and is therefore usable as a 3-D copier for arbitrary objects. For example, the object to be copied can be placed in a first region of the base 12 and an object, which corresponds to the starting object in particular with regard to shape and size, can be built up in a second region of the base. For this purpose, the provided object (to be copied) is firstly optically scanned and subsequently built up at another position by material application.

The object copy can be prepared in particular using an alternative scale, i.e., larger or smaller than the original object. The digital model can be scaled using a desired factor for this purpose.

In addition, before the preparation of the 3-D copy, a modification of the model data can be performed, whereby an adapted 3-D copy of the object is producible.

Figure 4:
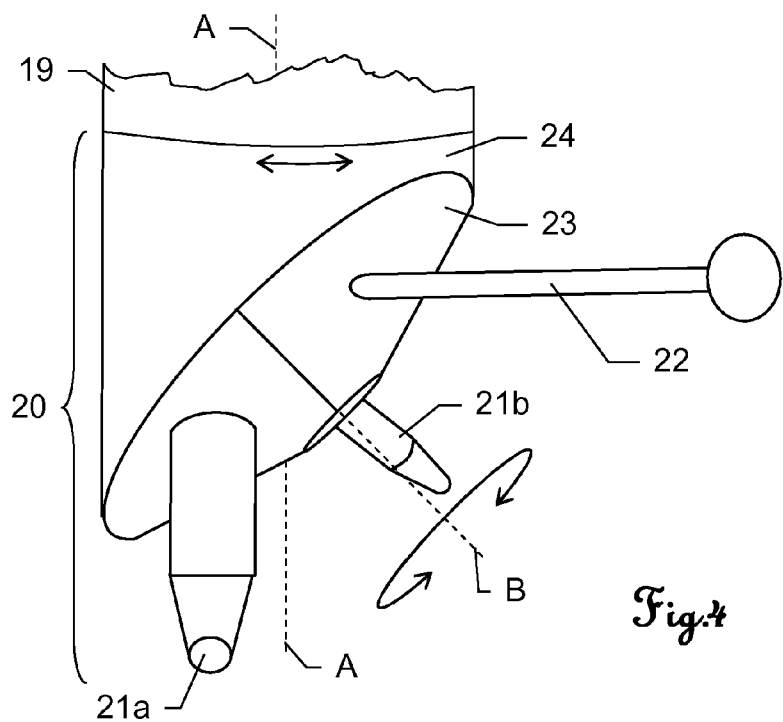
FIG. 4 shows an embodiment according to the invention of a printing head for a coordinate measuring machine according to the invention.

FIG. 4 shows an embodiment of a printing head 20 for a coordinate measuring machine according to the invention. The printing head 20 is arranged on the instrument carrier 19 of the CMM so that it is pivotable by a motor in relation thereto about an axis A.

The printing head 20 has three tools, namely a first printing unit 21a, a second printing unit 21b, and a measuring probe 22. According to alternative embodiments, the printing head 20 can be embodied in such a manner that it can carry two or more than three tools. The tools of the printing head 20 are furthermore arranged on a tool carrier 23, which is connected to a printing head base 24. The tool carrier 23 is arranged so that it is pivotable about the axis B in relation to the printing head base 24.

Using such a printing head 20, by appropriate pivoting of the tool carrier 23, in each case the tool which is to be used for the process step to be executed—for example, object buildup or object surveying—can be moved into a usage position. For example, in the alignment shown of the tool carrier 23, an object buildup can be performed by a material application by means of the first printing unit 21a. By rotating the tool carrier 23 by 120° about the axis B (counterclockwise), the measuring probe 22 can be moved into the usage position and surveying of the object can be performed.

For the material supply to the two printing units 21a-b, the printing head 20 is implemented in such a manner that the material can be guided in the interior of the printing head housing to the printing units 21a-b, in particular through tubing lines, which are connected in the usage state shown both to the instrument carrier 19 and also to the printing units 21a-b.

Figure 5:
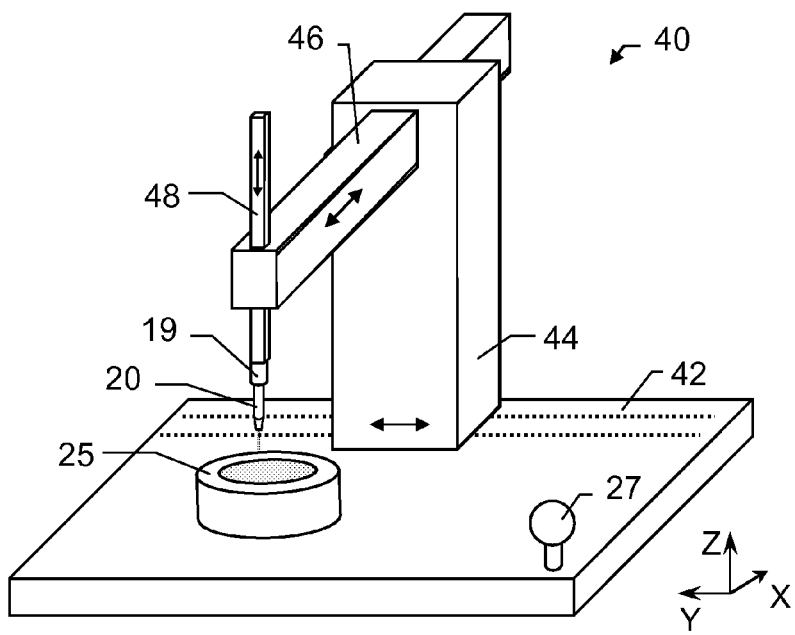
FIG. 5 shows a further embodiment of a coordinate measuring machine according to the invention.

FIG. 5 shows a further embodiment of a coordinate measuring machine 40 (CMM) according to the invention, wherein the CMM 40 has a base 42 and structure components 44, 46, 48 for providing a movement of the measuring head 19 (=of the instrument carrier 19) in relation to the base 42. For this purpose, the structure components 44, 46, 48 are movable in relation to one another by means of drive units (not shown), which connect the components 44, 46, 48.

A printing head 20 is arranged on the instrument carrier 19, wherein it is rigidly connected here, however, according to alternative embodiments, a pivotable arrangement on the instrument carrier 19 or a more pivotable printing head are implementable (cf. FIGS. 2-4 and 6). The printing head 20 has a nozzle, through which the material application for the object buildup is performed. The object 25 is again printable in this case based on an existing three-dimensional model, for example, CAD model. The object data are present in a memory unit of the CMM 10, for example. In this context, a layer-by-layer material application is performed for the preparation of the object 25, so that the resulting object 25 is represented by the entirety of the produced layers.

The production material (for example, liquid plastic or plastic granulate, which is pretreated for the object manufacturing), which is applied through the nozzle, is kept ready in a suitable container within the foot 44 of the CMM 40 and guided by means of an internal conveyor system via the other structure components 46, 48 up to the instrument carrier 19. The conveyor system has for this purpose in particular flexible tubing connections and at least one pressure generator, for example, a pump.

In addition, the CMM 40 has a reference body 27, the position of which within the measurement volume and also the shape and size of which are exactly known and in particular stored in the memory unit of the CMM 40. By surveying this reference body 27, measurement errors of the CMM 10 and the positioning of the measuring head 19 (instrument carrier) can be corrected or compensated for, for example, before or during a measurement process. A measuring sensor is arranged on the measuring head 19 alternatively to the printing head 20 or additionally thereto for such a reference measurement. The measuring sensor is implemented for this purpose, for example, as a measuring probe or as an (optical) sensor which measures in a contactless manner.

The reference body 27 can in particular be connected to the CMM 40 (or also arranged structurally separated from the CMM 40) in such a manner that its relative position with respect to a CMM coordinate system is stably provided, wherein it is positioned and/or implemented in particular in a temperature-invariant manner. The reference body 27 and/or its fastening (receptacle unit), in particular also at least partially the base 42 of the CMM 40, can be manufactured, for example, from Zerodur (material which is temperature invariant in a specific temperature range). Such an arrangement also provides a stable reference in the event of a heat effect on the CMM 40 which possibly occurs due to the material application.

An above-described referencing step can furthermore be performed before and/or during a manufacturing process of the object 25, wherein in particular the layer-by-layer buildup is interrupted and the surveying of the reference body 27 is performed within a specific time window, so that the quality properties of the resulting object 25 are not disadvantageously influenced by the interruption of the buildup operation.

The position referencing for the guide axes and the measuring head 19 (=instrument carrier) by means of the surveying of the reference body 27 is advantageous in particular with regard to the heat development and temperature change, which is possibly linked thereto, of the machine components 44, 46, 48. The material application of liquid plastic or metal, which is typically provided and applied at significantly elevated temperatures in relation to the ambient temperature for this purpose, can also result in a significant temperature increase of the components 44, 46, 48 and/or of the measuring head 19 and can thus cause a thermally related expansion of at least one of the components and therefore a positioning error. For example, temperature sensors can be provided on the relevant components for measuring and monitoring the temperatures on the CMM 40.

According to one specific embodiment of the invention, after a certain application time or a specific machine operating time, surveying of the reference body 27 can be performed (in particular automatically), wherein measured data are derived for the body 27 and these data are compared to a target positioning for the instrument holder 19 or the measuring sensor on the holder 19 and, based on this comparison, a recalibration or referencing of the relative positioning of the machine components 44, 46, 48 in relation to one another is carried out. Thermally related measurement errors may thus be compensated for. The precision with respect to the object production is accordingly also increased.

Alternatively to the performance in this manner after a specific time, a calibration can also be performed in dependence on items of information provided by the temperature sensors. For example, if a critical temperature value (for example, critical for the precise guiding or for the shape of the machine components) is exceeded, surveying of the reference body 27 and corresponding referencing of the system are thus performed automatically.

Figure 6:
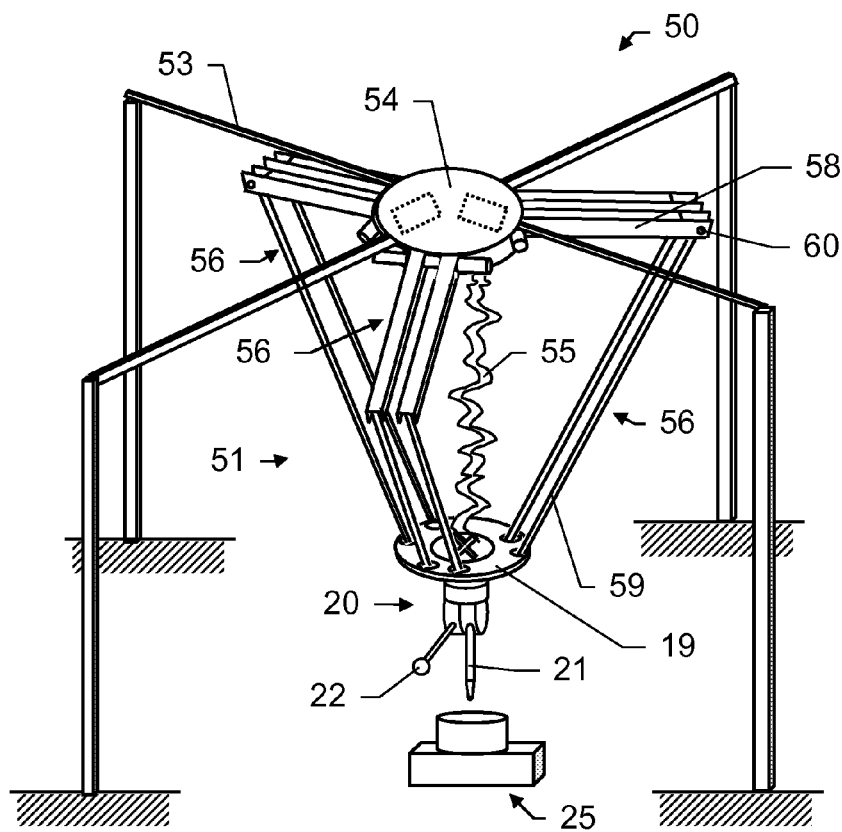
FIG. 6 shows a further embodiment of a coordinate measuring machine according to the invention implemented as a delta MM.

FIG. 6 shows a further embodiment of a coordinate measuring machine 50 according to the invention having a delta robot 51 as a unit which provides the movement of the instrument carrier 19 (=measuring head) ("delta measuring machine", delta MM 50).

The delta robot 51 has a stationary frame 53, which carries a robot base 54 (also stationary) and three arms 56, so-called kinematic chains. The frame 53 is typically embodied by a solid structure, but is shown solely schematically here for better visibility.

Each arm 56 of the delta robot 51 has two parts 58, 59, which are connected to one another by a joint 60, on the one hand, and are additionally connected by respective joints both to the stationary base 54 and also to the instrument carrier 19.

A movement of the instrument carrier 19 is implementable, for example, by a motor arranged on the robot base 54, by means of which the length of a cable connected to the instrument carrier 19 is settable and variable. A corresponding motor and a cable connection to the instrument carrier 19 are typically provided for this purpose for each arm 56. Alternatively, the instrument carrier 19 can be moved in a defined manner by means of a hydraulic system.

Generally known further embodiments for a coordinate measuring machine having delta robot are known, for example, from European patent application number EP 12183806.4 (filed on 11 Sep. 2012).

The instrument carrier 19 is implemented for carrying a measuring sensor, a printing unit, or—as shown here—a printing head 20 having measuring sensor 22 and printing unit 21. In addition, the instrument carrier 19 is implemented in such a manner that the measuring sensor, the printing head, or other tools are modularly replaceable. According to the above embodiments, the sensors and/or tools arranged on the printing head 20 can be embodied to be pivotable about multiple axes.

The material guide toward the printing head 20 is ensured here by a flexible hollow line 55 from the robot base 54 to the instrument carrier 19. According to alternative embodiments, the material transport can be performed along one or multiple arms 53 by means of correspondingly provided pipelines and jointed or flexible pipe connection pieces on the respective machine joints 60. The material provision at the robot base 54 can also be implemented by means of a corresponding hollow line.

The delta MM 50 furthermore has a control and processing unit for controlling an object buildup operation (=layer-by-layer printing of the object 25) or a measuring operation and for processing data detected during object surveying, for example. In an object buildup mode, the printing head 20 is therefore guided in a manner controlled by the control and processing unit along a predetermined path (the path can be derived, for example, from a digital model of the object 25). In this case, layers, each having a defined thickness, of a material provided for manufacturing the object 25 are printed on (preferably on a table implemented for this purpose—not shown). After curing of the applied material, the main manufacturing step of the object 25 is typically terminated. This curing can be terminated under normal room conditions after a specific duration, for example (chemical reaction of the material with room air). Alternatively or additionally, the printed object 25 can be temperature-controlled for optimum curing for a specific duration at a defined temperature and/or in a defined atmosphere, for example, in a furnace.

A transport tool (not shown), in particular a gripping tool, is fastenable on the instrument carrier 19 for the displacement and/or transport of the object 25. The printed object 25 can be gripped thereby and placed, for example, in the furnace (not shown) for curing. By means of such a gripper, for example, in general any object 25—whether it is the pattern to be copied, which is surveyed using the delta MM 50, or the object 25 manufactured by printing (for example, the copy of the pattern)—can be displaced within the measurement volume from a first position and alignment into a second position and alignment.

The invention claimed is:

1. A method for building up an object using a coordinate measuring machine, the object having associated digital model data, the method comprising:
    providing a coordinate measuring machine having at least one control unit and one drive unit for the controlled movement of an instrument carrier in relation to a base, the instrument carrier configured to carry one or both of a measuring sensor and a production tool, each of the at least one measuring sensor and production tool being modularly attachable either alone or together to the instrument carrier;
    controllably guiding the instrument carrier carrying the production tool, controllably guiding comprising aligning the production tool carrying the instrument carrier based on the digital model data; and
    controlling the production tool to perform precisely-positioned material application or material fixation in a manner that depends on the position and alignment of the production tool, controlling the production tool being based on the digital model data,
    wherein controlling the production tool causes the object to be built up by one or both of layer-by-layer material application and fixation,
    wherein building up the object is performed by one or both of a) precisely positioned material application and b) fixation with a precision corresponding to the position determination for at least one measurement point in the scope of a surface scanning executable by the production tool of the coordinate measuring machine.

2. The method according to claim 1 further comprising using the measurement sensor to surface scan with a position determination for at least one measurement point, the measurement sensor being carried by the instrument carrier on the production tool, the measurement sensor comprising a tactile sensor or an optical sensor.

3. The method according to claim 2 wherein the measurement point is embodied by a surface point of at least a partially built-up state of the object, the method further comprising correcting the material application building up of the object in an automatically controlled manner depending on the position of the measurement point and depending on the digital model data for the object.

4. The method according to claim 2 wherein the measurement point is embodied by a surface point of a pattern object, the method further producing and/or updating the digital model data depending on the pattern object.

5. The method according to claim 2 wherein the measurement point is embodied by a surface point of a previously known reference body, the method further comprising updating by having a referencing of the instrument carrier position on the basis of the position determined on the reference body for the measurement point.

6. The method according to claim 1 wherein the instrument carrier has an associated mobility, the method further comprising at least one of the following acts:
    positioning a defined rough body in a specific alignment and positioning with respect to the base and within a measurement volume defined by the mobility of the instrument carrier;
    using the production tool to build up the object using precisely-positioned material application on the rough body, and
    guiding the production tool along a defined path, wherein the path is derived from the digital model data.

7. The method according to claim 6 wherein the positioning is performed using a transport tool provided on the instrument carrier or production tool.

8. The method according to claim 1 further comprising at least one of the following acts:
    using the production tool to produce a buildup of a base structure of the object by coarse application of the material;
    adapting the base structure of the object by precisely-positioned surface modification of the at least partially built-up base structure, wherein adapting comprises using the production tool to perform a precisely-positioned fine application of the material for precise surface structuring, the production tool being implemented as a printing head and/or having at least one printing head; and
    controlling a milling tool or processing laser to perform a surface ablation, the instrument carrier or the production tool carrying the modification tool.

9. The method according to claim 8 further comprising at least one of the following acts:
    providing a coarse application printing unit for the coarse application, and providing a fine application printing unit for the fine application, the coarse application printing unit and the fine application printing unit arranged on the instrument carrier, or the production tool having the coarse application printing unit and the fine application printing unit, further performing an automatic change of the use of the printing units depending on the application to be executed, and
    aligning the instrument carrier in dependence on the execution of the buildup or the adaptation of the base structure in such a manner that the production tool or the modification tool is aligned in a defined manner in a working alignment, which is provided for the material application or for the surface modification, in relation to the object surface, wherein the instrument carrier carries at least two printing heads.

10. A coordinate measuring machine for building up an object having associated digital model data, the coordinate measuring machine comprising:
a base;
an instrument carrier;
a control unit;
a drive unit for the controlled movement of the instrument carrier in relation to the base, the instrument carrier configured to carry at least one measuring sensor,
the coordinate measuring machine having a surface scanning mode for determining at least one measurement point position on a surface by touching the surface using the measuring sensor carried by the instrument carrier,
the instrument carrier also being configured to carry a production tool implemented for material application and/or fixation,
the coordinate measuring machine having an object buildup mode controlled based on digital model data, the production tool being carried by the instrument carrier for guidance and alignment, the coordinate measuring machine being configured so that the production tool material can be applied and/or fixed in a precisely-positioned manner depending on a respective production tool position and alignment,
the control unit being configured to execute the object buildup mode so that the object can be built up, layer-by-layer, based on the digital model data,
wherein the production tool is configured to be guided, positioned and aligned with a positioning precision provided in the scope of the surface scanning mode for the measuring sensor.

11. The coordinate measuring machine according to claim 10 wherein the production tool comprises one or more of a printing head implemented for material application, and a laser emitter for emitting a laser beam for material fixation by laser sintering.

12. The coordinate measuring machine according to claim 10 wherein the production tool has a coarse application printing unit and a fine application printing unit, wherein during execution of the object buildup mode the measuring sensor is configured to:
prepare a base structure of the object in a first phase of the object buildup mode using the coarse application printing unit; and
prepare a surface adaptation of the base structure in a second phase of the object buildup mode using the fine application printing unit.

13. The coordinate measuring machine according to claim 10 configured so that a defined rough body can be placed in a specific alignment and positioning with respect to the base and within a measurement volume, which is defined by a mobility of the instrument carrier, and the object can be built up by the precisely-positioned material application on the rough body in a layer-by-layer material application.

14. The coordinate measuring machine according to claim 10 configured so that the digital model data can be generated at least partially by executing the surface scanning mode.

15. The coordinate measuring machine according to claim 10 wherein the instrument carrier is configured to carry a modularly attachable modification tool, the modification tool comprising a milling tool or processing laser,
the coordinate measuring machine further having an object modification mode that can perform a material ablation on the object surface in a controlled manner using the modification tool carried by the instrument carrier.

16. The coordinate measuring machine according to claim 10 wherein the production tool includes at least one of the measuring sensor, a modification unit embodying the modification tool, and a cooling nozzle.

17. The coordinate measuring machine according to claim 10 wherein the instrument carrier is at least one of:
a) pivotable about at least one axis (A, B, X, Y, Z), and
b) configured to simultaneously carry at least the measuring sensor and the production tool.

18. The coordinate measuring machine according to claim 10 further comprising:
material guiding means for providing the material for building up the object, the material guiding means comprising one or both of a tubular line structure and a temperature-controlled pipe arrangement, the material guiding means at least one of: connecting to the production tool and the material supply for the production tool for the material application, and
having an insulation or damping device with regard to a reduction of emission of thermal radiation.

19. A computer program product for use on a computer system for building up an object using a coordinate measuring machine having at least one control unit and one drive unit for the controlled movement of an instrument carrier in relation to a base, the instrument carrier configured to carry one or both of a measuring sensor and a production tool, each of the at least one measuring sensor and production tool being modularly attachable either alone or together to the instrument carrier, the object having associated digital model data, the computer program product comprising a tangible, non-transient computer usable medium having computer readable program code thereon, the computer program product comprising:
program code for controllably guiding the instrument carrier carrying the production tool, the program code for controllably guiding comprising program code for aligning the production tool carrying the instrument carrier based on the digital model data; and
program code for controlling the production tool to perform precisely-positioned material application or material fixation in a manner that depends on the position and alignment of the production tool, the program code for controlling the production tool being based on the digital model data,
wherein controlling the production tool causes the object to be built up by one or both of layer-by-layer material application and fixation.

* * * * *